(12) United States Patent
Martinez (10) Patent No.: US 11,374,346 B2
(45) Date of Patent: Jun. 28, 2022

(54) HIGH-VOLTAGE PUSH TO MATE ELECTRICAL INTERCONNECT

(71) Applicant: SAVANNAH RIVER NUCLEAR SOLUTIONS, LLC, Aiken, SC (US)

(72) Inventor: David K. Martinez, Harlem, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 211 days.

(21) Appl. No.: 16/897,735

(22) Filed: Jun. 10, 2020

(65) Prior Publication Data

US 2021/0391666 A1   Dec. 16, 2021

(51) Int. Cl.
| | | |
|---|---|---|
| H02G 15/18 | (2006.01) | |
| H01R 13/53 | (2006.01) | |
| H01R 13/627 | (2006.01) | |
| H01R 13/506 | (2006.01) | |

(52) U.S. Cl.
CPC .......... *H01R 13/506* (2013.01); *H01R 13/53* (2013.01); *H01R 13/6278* (2013.01); *H02G 15/18* (2013.01)

(58) Field of Classification Search
CPC .. H01R 13/506; H01R 13/53; H01R 13/6278; H02G 15/18
See application file for complete search history.

(56) References Cited

U.S. PATENT DOCUMENTS

| | | |
|---|---|---|
| 3,015,794 A | 1/1962 | Kishbaugh |
| 3,611,132 A * | 10/1971 | Wright ............... H01F 27/04 439/578 |
| 4,074,927 A | 2/1978 | Ball |
| 4,886,471 A * | 12/1989 | Fleshman Jr. ....... H01R 13/443 439/282 |
| 5,397,252 A | 3/1995 | Wang |
| 5,944,548 A | 8/1999 | Saito |
| 6,227,908 B1 * | 5/2001 | Aumeier ............ H01R 13/6593 439/186 |
| 7,478,475 B2 | 1/2009 | Hall |

(Continued)

FOREIGN PATENT DOCUMENTS

CN        110197965        9/2019

OTHER PUBLICATIONS

CONNECTRONICS. "In-Line Disconnects" *Connectronics Corp.* 11172-05 (2019) p. 1.

(Continued)

*Primary Examiner* — Briggitte R. Hammond
(74) *Attorney, Agent, or Firm* — Dority & Manning, P.A.

(57) ABSTRACT

A high-voltage self-aligning push to mate electrical interconnect device is provided. The electrical interconnect device includes a housing with a mating end and a receiving end. The interconnect also includes an insulator bushing configured to be affixed to the receiving end of the housing. The interconnect also includes a center pin disposed within the housing. The center pin extends from the mating end of the housing to the receiving end of the housing. The interconnect also includes a connector socket disposed within the insulator bushing and which is in electrical communication with the center pin. The interconnect also includes an alignment sleeve including a chamfered mating funnel defining a void configured to accept and surround the housing and at least a portion of insulator bushing.

20 Claims, 5 Drawing Sheets

(56) References Cited

U.S. PATENT DOCUMENTS

| | | |
|---|---|---|
| 7,607,929 B1 | 10/2009 | Nguyen et al. |
| 7,618,276 B2 | 11/2009 | Paglia et al. |
| 7,824,233 B2 | 11/2010 | Thelen |
| 8,002,574 B1 | 8/2011 | Yi |
| 9,692,191 B2 | 6/2017 | Tatzel et al. |
| 9,799,977 B1 | 10/2017 | Chiu et al. |
| 2014/0220805 A1 | 8/2014 | Haberek |
| 2018/0006398 A1 | 1/2018 | Cuban et al. |

OTHER PUBLICATIONS

Te. "LGH Circular Power Connector, Lead Assembly" *TE Connectivity* 863022-1 (2019) pp. 1-2.

Te. "RF Connector, SHV RF Interface" *TE Connectivity* 51494-2 (2019) pp. 1-2.

\* cited by examiner

HIGH-VOLTAGE PUSH TO MATE ELECTRICAL INTERCONNECT

GOVERNMENT SUPPORT CLAUSE

This invention was made with Government support under Contract No. DE-AC09-08SR22470, awarded by the U.S. Department of Energy. The Government has certain rights in the invention.

FIELD

The present disclosure relates generally to electrical connectors and, more particularly, to push to mate electrical interconnect devices for high-voltage applications.

BACKGROUND

Certain electrical systems and devices utilize interconnects to join or connect high-voltage conductors. For example, interconnects can be utilized in high-voltage transmission systems, machinery, equipment, or other applications. In certain applications, high-voltage connections must be made in glove boxes, confined spaces, enclosed locations, remote locations, or in other areas or commercial applications which require use of robotics or remote manipulators.

These applications present challenges or difficulties in accomplishing appropriate high-voltage connections when utilizing existing interconnect devices or methods. For instance, existing high-voltage interconnect devices can require precise manipulation of some or all of the components of the interconnect device to permit the interconnect device to engage a mating surface or connection point. It can be challenging to perform such precise manipulations, such as those required to align mating surfaces or connection points, when using robotics or remote manipulators to accomplish high-voltage connections. In some instances, precise manipulations of two separate components of existing interconnect devices may be required. Difficulties and challenges can be encountered in performing disparate precise manipulations of components of an interconnect device using robotics or remote manipulators or require the use of multiple robotic devices or remote manipulators resulting in increased costs and inefficiency. Precise manipulation of the interconnect device by a technician or end user can present increased risk of an accident or injury (e.g., by electrical shock) to the end user or technician. Additionally, connection or mating of high-voltage conductors or connectors without a suitable ground connection may result in high-voltage electricity unexpectedly migrating into other circuits or conductive materials.

Accordingly, an electrical interconnect for high-voltage applications with features that address one or more of the challenges noted above would be useful and welcomed.

BRIEF DESCRIPTION

Aspects and advantages of embodiments of the present disclosure will be set forth, in part, in the following description, or may be learned from the description, or may be learned through practice of the embodiments.

One example aspect of the present disclosure is directed to a push to mate electrical interconnect device for high-voltage applications. The electrical interconnect device can include a housing with a mating end and a receiving end. The electrical interconnect device can also include an insulator bushing configured to be affixed to the receiving end of the housing. A center pin can be disposed within the housing, and the center pin can extend from the mating end of the housing to the receiving end of the housing. The electrical interconnect device can also include a connector socket disposed within the insulator bushing. The connector socket of the electrical interconnect device is in electrical communication with the center pin. Additionally, the insulator bushing of the electrical interconnect device is formed from a dielectric having a dielectric strength greater than a dielectric strength of air.

Another exemplary embodiment of the present disclosure is directed to a self-aligning push to mate electrical interconnect. The interconnect can include a housing. The housing includes a mating end and a receiving end. The interconnect also includes an insulator bushing that is configured to be affixed to the receiving end of the housing. The interconnect can also have a center pin disposed within the housing. The center pin extends from the mating end of the housing to the receiving end of the housing. The interconnect also has a connector socket disposed, partially or entirely, within the insulator bushing. The connector socket can be in electrical communication with the center pin. The interconnect can also include an alignment sleeve defining a void. The alignment sleeve void can be configured to accept and surround, all or part of, the housing and, all or part of, the insulator bushing.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Repeat use of reference characters in the present specification and drawings is intended to represent the same or analogous features or elements of the present disclosure.

DETAILED DESCRIPTION

Reference will now be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, terms of approximation, such as "approximately," "substantially," or "about," refer to being within a ten percent margin of error.

Example aspects of the present disclosure relate generally to self-aligning electrical connectors and, more particularly, to push to mate electrical interconnect devices for high-voltage applications. The electrical interconnect device according to example aspects of the present disclosure can be utilized to connect electrical conductors (e.g., such that the connectors are in electrical communication or in physical contact) in high-voltage, low current applications ranging from a few hundred volts to tens of thousands of volts. For example, the electrical interconnect device of the present disclosure can be utilized in applications including voltages ranging from about 5 kV to about 30 kV. For example, the electrical interconnect device according to example aspects of the present disclosure can be utilized with various electrical conductors, wires, and cables, such as coaxial cable.

While certain cables, pins, connectors, conductors, and coaxial cable may be discussed as being compatible with respect to certain example embodiments of the present disclosure, it will be appreciated by those of skill in the art that other electrical conductors, wires, or cables may be utilized with the electrical interconnect devices of the present disclosure. The electrical interconnect devices of the present disclosure can also be utilized to mate or connect electrical conductors or other electrical components to, between, or for use with instrumentation or measurement devices (e.g., such that the instrumentation or measurement devices can receive electrical signals or other signals from the conductors). The example embodiments of the electrical interconnect device of the present disclosure include a push-on/pull-off SHV (safe high-voltage) connector. However, while a SHV connector may be discussed with respect to certain example embodiments of the electrical interconnect device of the present disclosure, it will be appreciated that other electrical connectors, such as MHV (miniature high-voltage) or BNC (Bayonet Neill-Concelman), may be utilized with or used as part of the electrical interconnect device of the present disclosure.

The electrical interconnect device according to example aspects of the present disclosure can also include certain insulating components and features which provide increased shielding capabilities to, e.g., reduce or minimize electrical interference, electrical noise intrusion, or other disturbances which may negatively impact the capability of the electrical conductors, wires, cables, instrumentation, measurement, or other devices with which the electrical interconnect devices are utilized (e.g., resulting in decreased performance due to distorted signals). In addition to reducing interference, the insulating components of the electrical interconnect device according to example embodiments of the present disclosure can facilitate, contribute to, or promote self-alignment of the electrical interconnect device with a corresponding electrical connection or device, such as a bulk-head fitting, female fitting, pin, or another electrical connection or device including a bayonet connector, to allow the electrical interconnect device to securely engage the corresponding electrical device (e.g., such as a pin or bulk-head fitting) such that an electrical conductor of the electrical interconnect device is in electrical communication with one or more conductors (e.g., such as a pin) in the corresponding electrical connection, device, or fitting. For example, the insulating component or feature of the electrical interconnect device of the present disclosure can be an insulator bushing which is attached to a housing of a SHV connector.

In addition to providing electrical insulation (e.g., reducing the risk of electrical shock to the end user or technician and reducing electrical noise intrusion), the insulating components of the electrical interconnect device according to example aspects of the present disclosure include aspects to facilitate self-alignment and manipulation and appropriate high-voltage electrical connection by robotics, remote manipulators, or other remove means. For example, the insulator bushing of the electrical interconnect device can be formed in a cylindrical shape and define a void configured to accept one or more electrical conductors (e.g., a coaxial cable, a circular connector socket, or Contact MIL Socket) and/or a portion of the SHV connector can be received within the void. The insulator bushing can also be attached to the housing of the SHV connector. The diameter of the insulator bushing can be application specific or can correspond to the robotics or remote manipulators which may be utilized to manipulate the electrical interconnect device. In a typical application in which a SHV connector is utilized, the diameter of the cylindrical insulator bushing will be 0.75 inches, or about 0.75 inches. This diameter can be desired as it will allow the electrical interconnect device according to example aspects of the present disclosure to be utilized with many commercially available SHV connectors and with corresponding electrical connections or devices configured to receive or connect to the commercially available SHV connectors, such as a bulk-head fitting, pin, or another electrical connection or device including a bayonet connector.

The insulator bushing can be constructed from dielectric material, such as a PVDF (polyvinylidene fluoride) resin (e.g., Kynar®) or Polytetrafluoroethylene (e.g., Teflon®). In example embodiments of the electrical interconnect device of the present disclosure, the dielectric material of the insulator bushing will have a dielectric strength that is greater than the ambient air. The dielectric material utilized to form the insulator bushing can be application specific and based, at least in part, on the thickness of the insulator bushing, the voltage level to which the electrical interconnect device or SHV connector is rated, and the voltage per unit thickness at which the subject dielectric material will conduct electricity. Similarly, the thickness of the insulator bushing of the electrical interconnect device will be based, at least in part, on the voltage level to which the electrical interconnect device or SHV connector is rated and the dielectric material utilized to construct the insulator bushing.

Example embodiments of the electrical interconnect device of the present disclosure may also include a grounding strap or external grounding clamp to connect one or more components of the electrical interconnect device to an external ground or grounding point, which is separate from the ground connection or grounding capabilities of shielding in a coaxial cable, that may be connected to the electrical interconnect device before the electrical interconnect device is pushed on to a corresponding electrical connection or device, such as, e.g., a bulk-head fitting, pin or another electrical connection or device including a bayonet connector. The external grounding clamp provides a path through which spurious voltage or electrical charges can be channeled to ground. In this way, the external grounding clamp reduces the risk of electrical shock to the end user or technician and reduces electrical noise intrusion, thereby resulting in a transmission of cleaner signals through the conductors and the junction or connection formed, in part, by the electrical interconnect device.

Referring now to the figures, example aspects of the present disclosure will be discussed in greater detail.

Figure 1:
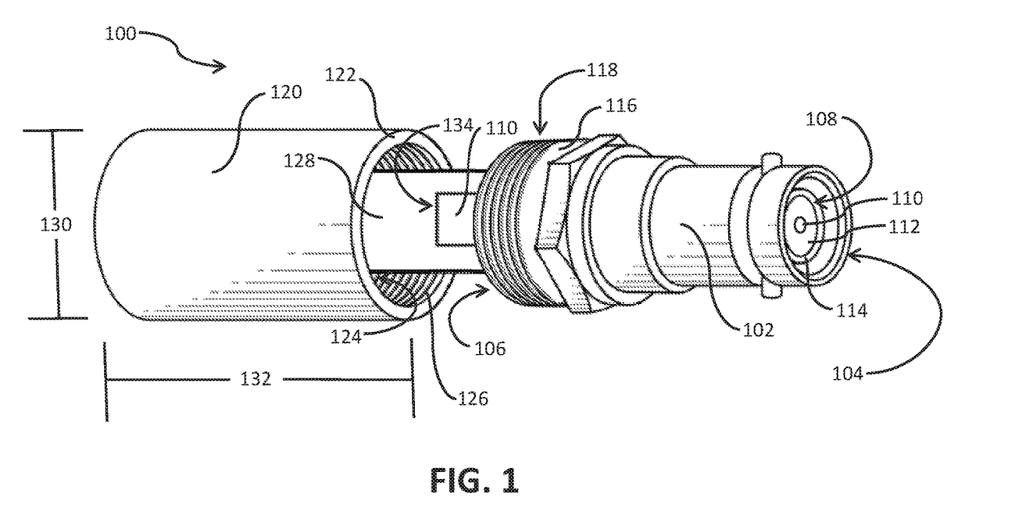
FIG. 1 depicts a perspective view of a partially disassembled electrical interconnect device.
Figure 2:
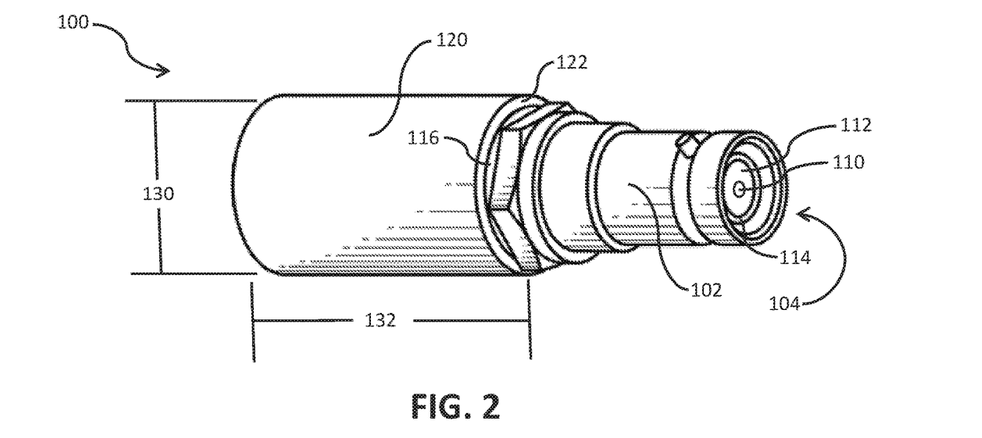
FIG. 2 depicts a perspective view of the electrical interconnect device of FIG. 1 in an assembled configuration.

Referring now generally to FIGS. 1 and 2, FIG. 1 provides a perspective view of a partially disassembled electrical interconnect device 100. FIG. 2 depicts a perspective view of the electrical interconnect device of FIG. 1 in an assembled configuration.

Electrical interconnect device 100 includes a housing 102. Housing 102 can be a SHV connector or another type of push on/pull off connectors suitable for high-voltage/low current applications. Housing 102 includes a mating end 104 and a receiving end 106. Receiving end 106 define an opening (not shown) configured to accept a connector socket 128 (e.g., a circular connector socket or contact MIL Socket). Housing 102 is configured such that electrical conductor 108 extends through housing 102 from the receiving end 106 to the mating end 104. Electrical conductor 108 includes a center pin 110, insulating layer 112 and shielding layer 114. Electrical interconnect device 100 includes a grommet 116 and threads 118 adjacent to the receiving end 106.

Electrical interconnect device 100 includes an insulator bushing 120. Insulator bushing 120 include a dielectric border 122 configured in a cylindrical shape and which define a void 124. Void 124 is configured to accept circular connector 128 (e.g., a circular connector socket or Contact MIL Socket) and/or a portion of center pin 110, and/or a portion of the threads 118 of housing 102. Insulator bushing 120 includes threads 126 which correspond to threads 118 such that insulator bushing 120 and housing 102 can be mechanically coupled (e.g., screwed together as shown in FIG. 2). Insulator bushing 120 can also be attached to housing 102 by other approaches of mechanical attachment such as crimping or by use of adhesive.

One or more components of electrical conductor 108, such as center pin 110, and threads 118 can be received within void 124 of insulator bushing 120. When center pin 110 is received within void 124, center pin 110 in electrical communication with connector socket 128 at junction 134. Center pin 110 may also be mechanically attached to connector socket 128 at junction 134, though e.g., a press fit, crimping, soldering or other form of attachment. Connector socket 128 may be a circular connector socket configured to receive center pin 110, such that connector socket 128 can be crimped around center pin 110. Diameter 130 of insulator bushing can be application specific or can correspond to robotics or remote manipulators which may be utilized to manipulate the electrical interconnect device 100. In certain embodiments (e.g., where housing 102 is a commercially available SHV connector) the diameter 130 of the cylindrical insulator bushing 120 is 0.75 inches, or about 0.75 inches. The length 132 of insulator busing 120 is 1.3125 inches, or about 1.3125 inches. Such dimensions of the insulator bushing 120 are suitable to use with existing commercially available robotics or remote manipulators which can be utilized to manipulate the electrical interconnect device 100. Connector socket 128 can also be connected to a cable 310 (shown in FIG. 3), such as a coaxial cable which is in electrical communication with or connected to connector socket 128 within a portion of void 124 which is situated away from housing 102.

Insulator bushing 120 can be constructed from a dielectric material, such as a PVDF (polyvinylidene fluoride) resin (e.g., Kynar®) or Polytetrafluoroethylene (e.g., Teflon®), which has a dielectric strength that is greater than air. The dielectric material utilized to form insulator bushing 120 is based, at least in part, on the thickness of dielectric border 122, the voltage level to which the electrical interconnect device 100 is rated (e.g., a maximum voltage or current rating) and the voltage per unit thickness at which the subject dielectric material will conduct electricity. Similarly, the thickness of dielectric border 122 or insulator bushing 120 can be based, at least in part, on the voltage level to which the electrical interconnect device 100 is rated and the type of dielectric material utilized to construct the insulator bushing.

FIG. 2 depicts a perspective view of the electrical interconnect device of FIG. 1 in an assembled configuration. As shown in FIG. 2, housing 102 is mechanically fastened (e.g., screwed into) insulator bushing 120 through the mating of threads 118 and 126. Grommet 116 can provide a weather or dust resistant seal between housing 102 and insulator bushing 120. In the assembled configuration depicted in FIG. 2, the insulating bushing 120 can facilitate manipulation and appropriate high-voltage electrical connection by robotics, remote manipulators or other remote means. Robotics or remote manipulator devices can be attached to or grasp the insulator bushing 120 and be utilized to manipulate the electrical interconnect device 100 and cause connect interconnect device 100 with corresponding electrical connection or device configured to receive or connect to electrical interconnect device 100, such as a bulk-head fitting, pin or another electrical connection or device including a bayonet connector.

Figure 3:
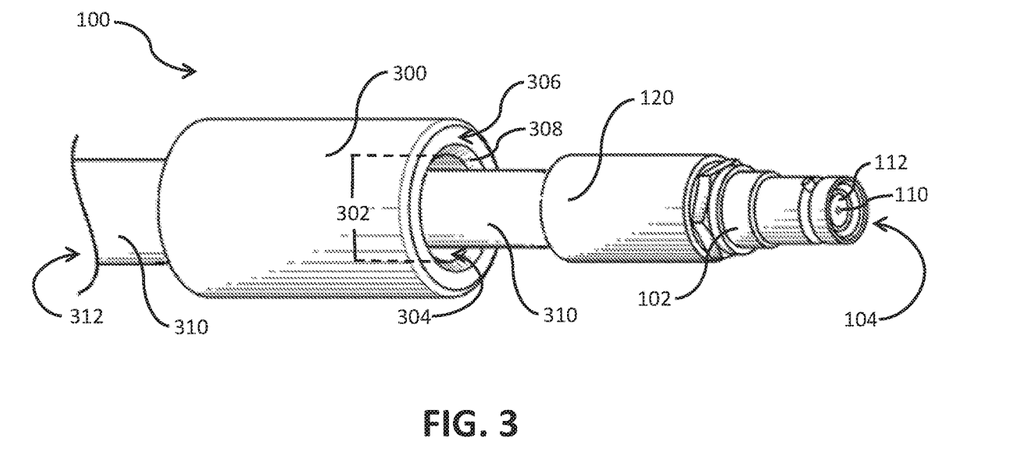
FIG. 3 depicts a perspective view of the partially disassembled electrical interconnect device of FIG. 1, showing additional features according to exemplary embodiments of the present disclosure.
Figure 8:
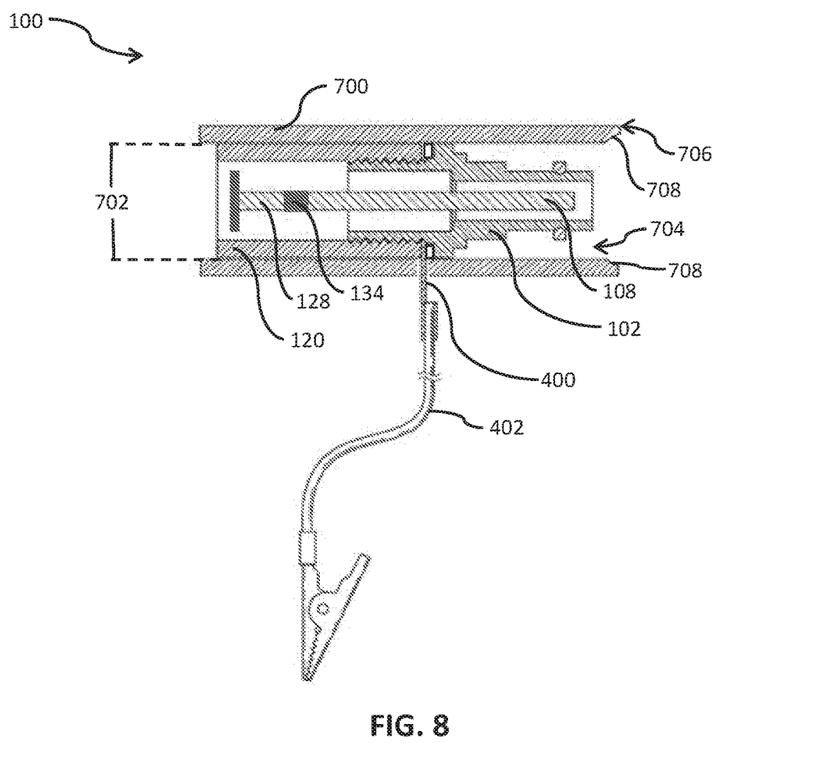
FIG. 8 depicts a side sectional view of the electrical interconnect device of FIG. 7, showing additional components of the electrical interconnect device according to exemplary embodiments of the present disclosure.

FIG. 3 depicts a perspective view of the partially disassembled electrical interconnect device 100 of FIG. 1, showing additional features according to example embodiments of the present disclosure. Cable 310 can be connected to or in electrical communication with a power source (not shown) at connection point 312, such that power is transferred from power source to center pin 110. Electrical interconnect device 100 can also include an alignment sleeve 300. Alignment sleeve 300 can be constructed from a dielectric material, such as a PVDF (polyvinylidene fluoride) resin (e.g., Kynar®) or Polytetrafluoroethylene (e.g., Teflon®), which has a dielectric strength that is greater than air. Alignment sleeve 300 includes an inner diameter 302 which corresponds to diameter 130 of insulating bushing, such that alignment sleeve 300 can be a cylindrical shape and inner diameter 302 defines a void 304. Void 304 is configured to accept insulator bushing 120 and housing 102 within void 304 as shown in FIG. 8. Alignment sleeve 300 includes a mating funnel 306. Mating funnel 306 includes a chamfered guide surface 308. Guide surface 308 is angled or sloped toward the center of void 304 such that any object or surfaces coming into contact with guide surface 308 is directed into void 304. In this way, alignment sleeve 300 operates to assist with alignment of center pin 110 such that center pin 110 is aligned with, connected to, or in electrical communication with a corresponding electrical conductor (not shown) and facilitates an electrical connection at mating end 104 of housing 102.

Figure 4:
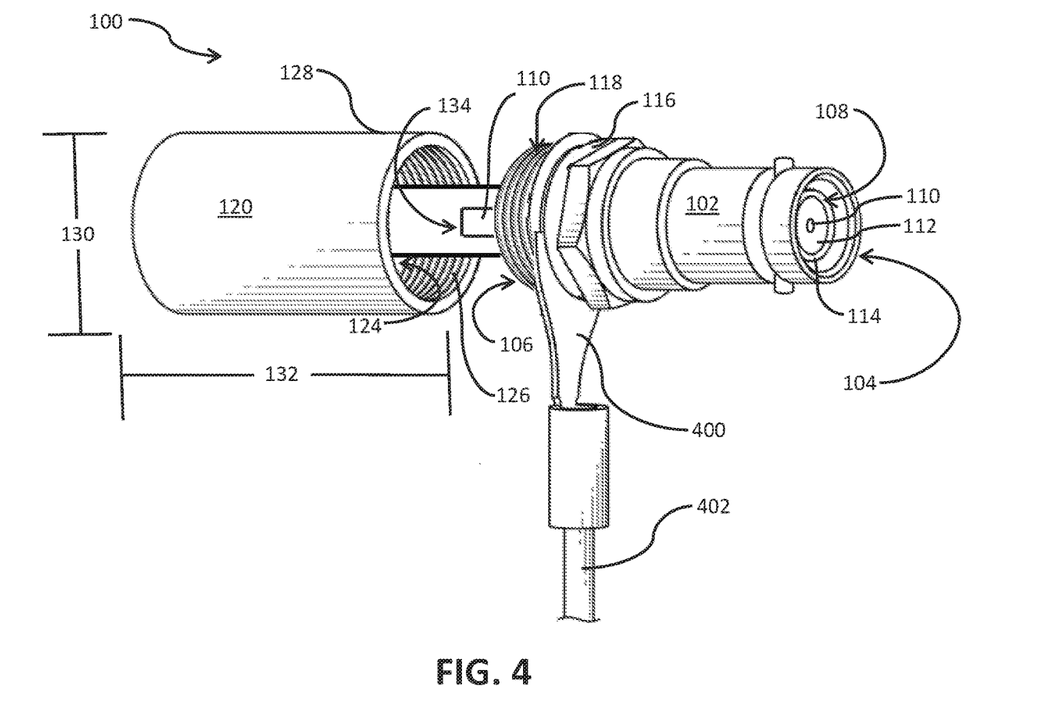
FIG. 4 depicts a perspective view of the partially disassembled electrical interconnect device of FIG. 1, showing additional features according to exemplary embodiments of the present disclosure.

FIG. 4 depicts a perspective view of the partially disassembled electrical interconnect device of FIG. 1, showing additional features according to example embodiments of the present disclosure. Electrical interconnect device 100 includes an external grounding strap 400 to connect housing 102 to an external ground or grounding point (not shown), which is separate from the ground connection or grounding capabilities of shielding layer 114. Grounding strap 400 may be connected to the electrical interconnect device 100 before the electrical interconnect device 100 is pushed on to a corresponding electrical connection or device, such as, e.g., a bulk-head fitting, pin or another electrical connection or device including a bayonet connector. The external grounding clamp provides a path to ground via a shielded conductor 402 through which spurious voltage or electrical charges can be channeled away from electrical interconnect device 100 to a ground (not shown). In this way, the external grounding strap 400 reduces the risk of electrical shock to the end user or technician and reduces electrical noise intrusion, thereby resulting in a transmission of cleaner signals through the conductors and the junction or connection formed, in part, by the electrical interconnect device 100.

Figure 5:
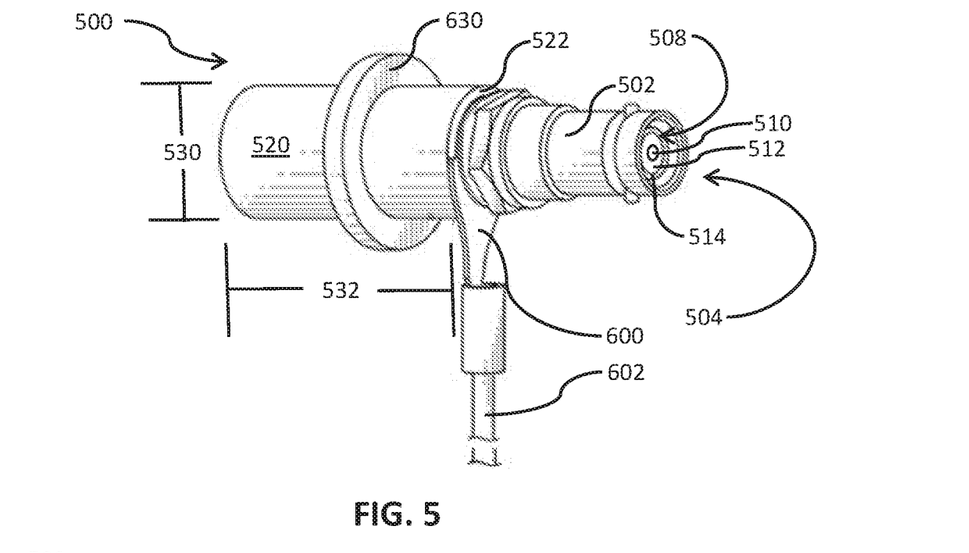
FIG. 5 depicts another embodiment of an electrical interconnect device according to exemplary embodiments of the present disclosure.
Figure 6:
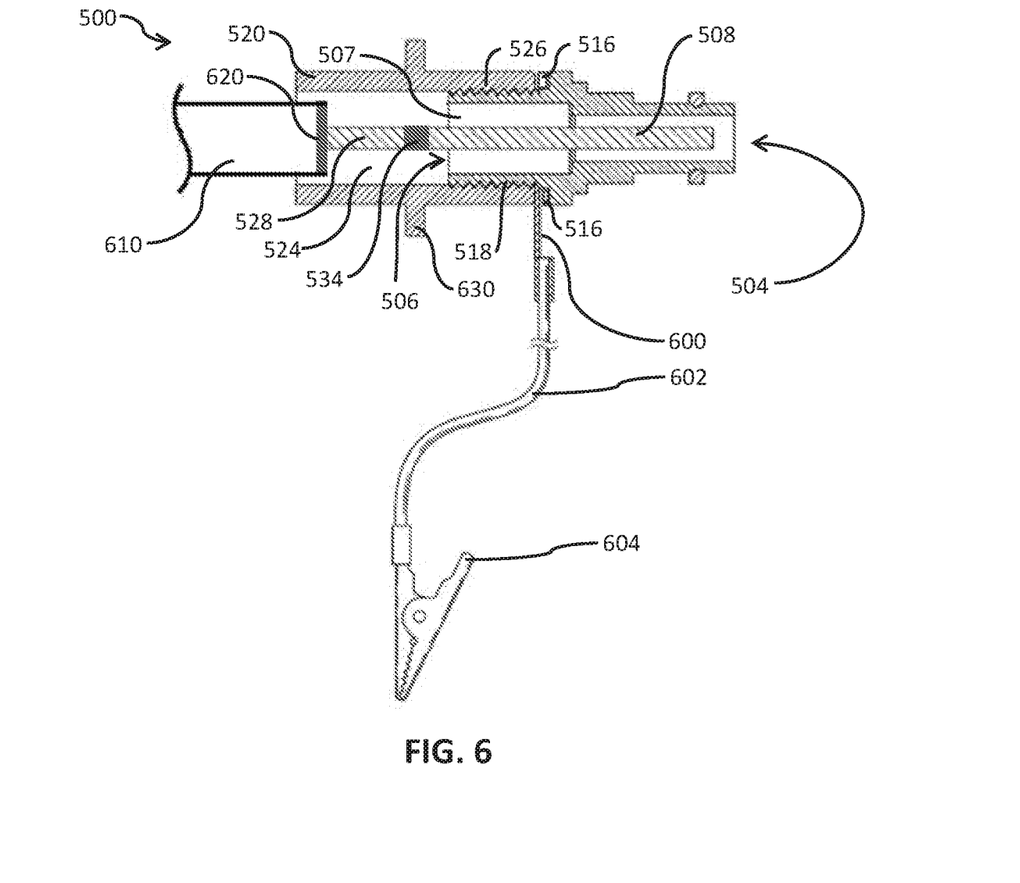
FIG. 6 depicts a side sectional view of the electrical interconnect device of FIG. 5, showing additional components of the electrical interconnect device according to exemplary embodiments of the present disclosure.

Referring now generally to FIGS. 5 and 6. FIG. 5 depicts another embodiment of a partially disassembled electrical interconnect device 500 according to example embodiments of the present disclosure. FIG. 6 depicts a side sectional view of the electrical interconnect device of FIG. 5, showing additional components of the electrical interconnect device according to example embodiments of the present disclosure.

Electrical interconnect device 100 includes a housing 502. Housing 502 can be a SHV connector or another type of push on/pull off connectors suitable for high-voltage/low current applications. Housing 502 includes a mating end 504 and a receiving end 506 (shown in FIG. 6). Receiving end 506 defines an opening 507 configured to accept a connector socket 528 (e.g., a circular connector socket or contact MIL Socket). Housing 502 is configured such that electrical conductor 508 extends through housing 502 from the receiving end 506 to the mating end 504. Electrical conductor 508 includes a center pin 510, insulating layer 512, and shielding layer 514. Electrical interconnect device 500 includes a grommet 516 and threads 518 adjacent to the receiving end 506.

Electrical interconnect device 500 includes an insulator bushing 520. Insulator bushing 520 include a dielectric border 522 configured in a cylindrical shape and which defines a void 524. Void 524 is configured to accept circular connector 528 (e.g., a circular connector socket or Contact MIL Socket) and/or a portion of center pin 510, and/or a portion of the threads 518 of housing 502. Insulator bushing 520 includes threads 526 which correspond to threads 518 such that insulator bushing 520 and housing 502 can be mechanically coupled (e.g., screwed together). Insulator bushing 520 can also be attached to housing 502 by other approaches of mechanical attachment such as crimping or by use of adhesive.

One or more components of electrical conductor 508, such as center pin 510, and threads 518 can be received within void 524 of insulator bushing 520. When center pin 510 is received within void 524, center pin 510 in electrical communication with connector socket 528 at junction 534. Center pin 510 may also be mechanically attached to connector socket 528 at junction 534, though e.g., a press fit, crimping, soldering or other form of attachment. Connector socket 528 may be a circular connector socket configured to receive center pin 510, such that connector socket 528 can be crimped around center pin 510. Diameter 530 of insulator bushing can be application specific or can correspond to robotics or remote manipulators which may be utilized to manipulate the electrical interconnect device 500. In certain embodiments (e.g., where housing 502 is a commercially available SHV connector) the diameter 530 of the cylindrical insulator bushing 520 is 0.75 inches, or about 0.75 inches. The length 532 of insulator busing 520 is 1.3125 inches, or about 1.3125 inches. Such dimensions of the insulator bushing 520 are suitable to use with existing commercially available robotics or remote manipulators which can be utilized to manipulate the electrical interconnect device 500. Connector socket 528 can also be connected to a cable 610 (shown in FIG. 6) at junction 620, such as a coaxial cable which is in electrical communication with or connected to connector socket 528 within a portion of void 524 which is situated away from housing 502. In certain embodiments, void 524 may include or be filled with a polymer, insulating material, dielectric, or other material in which connector socket 528 is embedded or otherwise secured.

Insulator bushing 520 can be constructed from a dielectric material, such as a PVDF (polyvinylidene fluoride) resin (e.g., Kynar®) or Polytetrafluoroethylene (e.g., Teflon®), which has a dielectric strength that is greater than air. The dielectric material utilized to form insulator bushing 520 is based, at least in part, on the thickness of dielectric border 522, the voltage level to which the electrical interconnect device 500 is rated (e.g., a maximum voltage or current rating) and the voltage per unit thickness at which the subject dielectric material will conduct electricity. Similarly, the thickness of dielectric border 522 or insulator bushing 520 can be based, at least in part, on the voltage level to which the electrical interconnect device 500 is rated and the type of dielectric material utilized to construct the insulator bushing. Insulator bushing 520 can also include a flange 630. Flange 630 can be integrally formed as part of insulator bushing 520. In other embodiments, flange 630 may be mechanically fastened to insulator bushing. Flange 630 can extend around the exterior circumference of insulator bushing 520. In other embodiments, flange 630 can extend around only a portion of exterior circumference of insulator bushing 520.

Housing 502 is mechanically fastened (e.g., screwed into) insulator bushing 520 through the mating of threads 518 and 526. Grommet 516 can provide a weather- or dust-resistant seal between housing 502 and insulator bushing 520. The insulating bushing 520 can facilitate manipulation and appropriate high-voltage electrical connection by robotics, remote manipulators, or other remote means. Robotics or remote manipulator devices can be attached to or grasp the insulator bushing 520 and can be utilized to manipulate the electrical interconnect device 500 and cause connect interconnect device 500 with corresponding electrical connection or device configured to receive or connect to electrical interconnect device 500, such as a bulk-head fitting, pin, or another electrical connection or device including a bayonet connector. Flange 630 can act to secure, support, or reinforce the location where the robotics or remote manipulator devices are attached to or grasp the insulator bushing 520. As such, flange 630 can prevent or reduce the possibility of the robotic device or remote manipulator device from sliding or moving while force is exerted upon electrical interconnect device 500 to connect interconnect device 500 to a corresponding device configured to receive or form an electrical connection or communication with electrical interconnect device 500, such as a bulk-head fitting, pin, or another electrical connection or device including a bayonet connector.

Electrical interconnect device 500 include an external grounding strap 600 to connect housing 502 to an external ground or grounding point (not shown) through a connection device 604, which is separate from the ground connection or grounding capabilities of shielding layer 514. Grounding strap 600 may be connected to the electrical interconnect device 500 before the electrical interconnect device 500 is pushed on to a corresponding electrical connection or device, such as, e.g., a bulk-head fitting, pin, or another electrical connection or device including a bayonet connector. The external grounding strap 600 provides a path to ground via a shielded conductor 602 through which spurious voltage or electrical charges can be channeled away from electrical interconnect device 500 to a ground (not shown). In this way, the external grounding strap 600 reduces the risk of electrical shock to the end user or technician and reduces electrical noise intrusion, thereby resulting in a transmission of cleaner signals through the conductors and the junction or connection formed, in part, by the electrical interconnect device 500.

Figure 7:
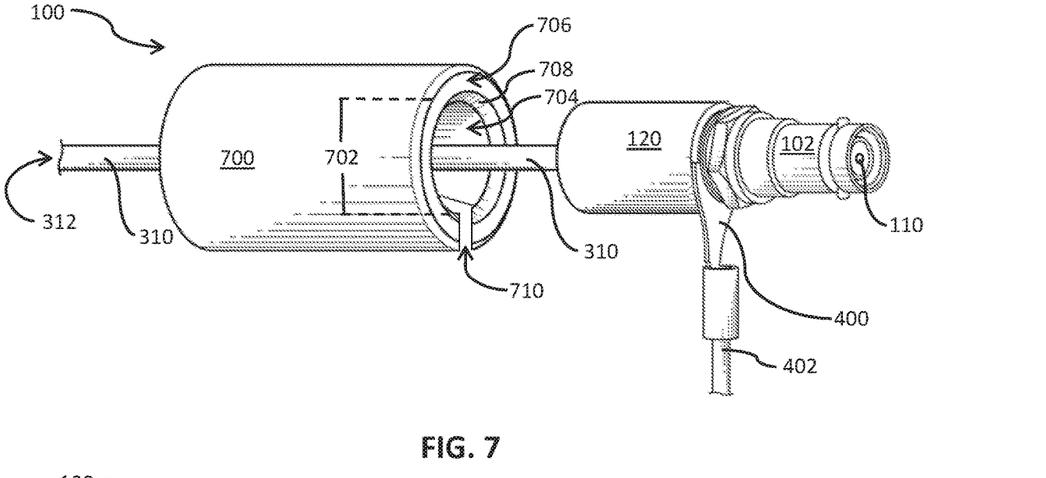
FIG. 7 depicts a perspective view of the electrical interconnect device of FIG. 4, including a chamfered cylinder with mating funnel according to exemplary embodiments of the present disclosure.

Referring now generally to FIGS. 7 and 8, FIG. 7 depicts a perspective view of the partially disassembled electrical interconnect device 100 of FIG. 4, showing additional features according to example embodiments of the present disclosure. FIG. 8 depicts a side sectional view of the electrical interconnect device of FIG. 7.

Cable 310 can be connected to or in electrical communication with a power source (not shown) at connection point 312, such that power is transferred from power source to center pin 110. Electrical interconnect device 100 can also include an alignment sleeve 700. Alignment sleeve 700 can be constructed from a dielectric material, such as a PVDF (polyvinylidene fluoride) resin (e.g., Kynar®) or Polytetrafluoroethylene (e.g., Teflon®), which has a dielectric strength that is greater than air. Alignment sleeve 700 includes an inner diameter 702 which corresponds to diameter 130 of insulating bushing. Alignment sleeve 700 can be a cylindrical shape and the inner diameter 702 defines a void 704. Void 704 is configured to accept insulator bushing 120 and housing 102 within void 704 as shown in FIG. 8. Alignment sleeve 700 includes a mating funnel 706. Mating funnel 706 includes a chamfered guide surface 708. Mating funnel 706 extends past the mating end 104 of electrical interconnect device 100. Guide surface 708 is angled or sloped toward the center of void 704 such that any object or surfaces coming into contact with guide surface 708 are directed into void 704. In this way, alignment sleeve 700 operates to assist with alignment of center pin 110 such that center pin 110 is aligned with, connected to, or in electrical communication with a corresponding electrical conductor (not shown) and facilitates an electrical connection at mating end 104 of housing 102. Alignment sleeve 700 also includes a slot 710 to accept grounding strap 400 when housing 102 and insulator bushing 120 are received within void 704, as shown in FIG. 8. Once housing 102 and insulator bushing 120 are received within void 704, alignment sleeve 700 can be crimped such that slot 710 is closed and alignment sleeve 700 is secured around housing 102 and insulator bushing 120. As shown in FIG. 8, the mating funnel 706 of the alignment sleeve 700 extends beyond the mating end of the housing 102 such that the mating end 104 of the housing 102 is recessed within the alignment sleeve void 704. Additionally, as shown in FIG. 8, the housing 102 and the insulator bushing 120 are disposed entirely within the void 704 of the alignment sleeve 700.

Figure 9:
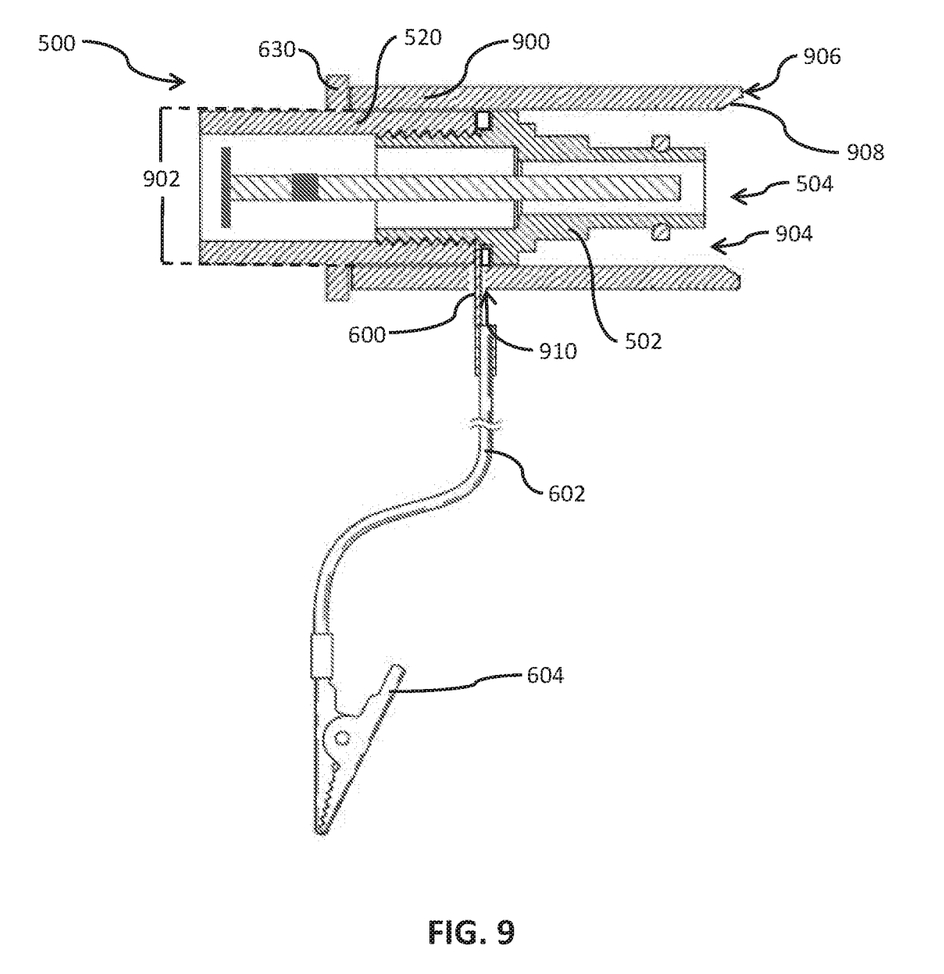
FIG. 9 depicts a side sectional view of the electrical interconnect device of FIGS. 5 and 6, including a chamfered mating funnel according to exemplary embodiments of the present disclosure.

FIG. 9 depicts a side sectional view of the electrical interconnect device of FIGS. 5 and 6, including a chamfered cylinder with mating funnel according to example embodiments of the present disclosure. Electrical interconnect device 100 can also include an alignment sleeve 900. Alignment sleeve 900 can be constructed from a dielectric material, such as a PVDF (polyvinylidene fluoride) resin (e.g., Kynar®) or Polytetrafluoroethylene (e.g., Teflon®), which has a dielectric strength that is greater than air. Alignment sleeve 900 includes an inner diameter 902 which corresponds to diameter 530 of insulating bushing. Alignment sleeve 900 can be a cylindrical shape, and the inner diameter 902 defines a void 904. Alignment sleeve void 904 is configured to accept a portion of insulator bushing 520 and housing 502 within void 904. Alignment sleeve 900 includes a mating funnel 906. Mating funnel 906 includes a chamfered guide surface 908. Mating funnel 906 extends past the mating end 504 of electrical interconnect device 500. Guide surface 908 is angled or sloped toward the center of void 904 such that any object or surfaces coming into contact with guide surface 908 are directed into void 904. In this way, alignment sleeve 900 operates to assist with alignment of center pin 510 such that center pin 510 is aligned with, connected to or in electrical communication with a corresponding electrical conductor (not shown) and facilitate an electrical connection at mating end 504 of housing 502. Alignment sleeve 900 also includes a slot 910 to accept grounding strap 400 when housing 502 and a portion of insulator bushing 520 are received within void 904. Alignment sleeve 900 is positioned adjacent to flange 630. Once housing 502 and a portion of insulator bushing 520 are received within void 904 and alignment sleeve is positioned adjacent to flange 630, alignment sleeve 900 can be crimped such that slot 910 is closed and alignment sleeve 900 is secured around housing 502 and insulator bushing 520.

Although specific features of various embodiments may be shown in some drawings and not in others, this is for convenience only. In accordance with the principles of the present disclosure, any feature of a drawing can be referenced and/or claimed in combination with any feature of any other drawing.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical interconnect device for high-voltage applications, the interconnect device comprising:

a housing including a mating end and a receiving end;

an insulator bushing configured to be affixed to the receiving end of the housing;

a center pin disposed within the housing, wherein the center pin extends from the mating end of the housing to the receiving end of the housing;

a connector socket disposed within the insulator bushing, wherein the connector socket is in electrical communication with the center pin; and wherein the insulator bushing comprises a dielectric having a dielectric strength greater than a dielectric strength of air.

2. The electrical interconnect device of claim 1, further comprising an alignment sleeve defining a void configured to accept and surround the housing and at least a portion of insulator bushing.

3. The electrical interconnect device of claim 1, further comprising a grounding strap in electrical communication with the housing and a grounding point.

4. The electrical interconnect device of claim 2, wherein the alignment sleeve includes a chamfered mating funnel.

5. The electrical interconnect device of claim 4, wherein the chamfered mating funnel comprising a guide surface angled toward the void of the alignment sleeve.

6. The electrical interconnect device of claim 5, wherein the housing and the insulator bushing are disposed entirely within the void of the alignment sleeve.

7. The electrical interconnect device of claim 6, wherein the chamfered mating funnel of the alignment sleeve extends beyond the mating end of the housing such that the mating end of the housing is recessed within the alignment sleeve void.

8. The electrical interconnect device of claim 3, further comprising an alignment sleeve defining a void configured to accept and surround the housing and, at least, a portion of insulator bushing and, at least, a portion of the grounding strap.

9. The electrical interconnect device of claim 8, wherein the alignment sleeve includes a slot configured to receive at least a portion of the grounding strap.

10. The electrical interconnect device of claim 5, further comprising a flange affixed to the insulator bushing.

11. The electrical interconnect device of claim 10, wherein the alignment sleeve is positioned adjacent to the flange and the alignment sleeve extends beyond the mating end of the housing such that the mating end of the housing is recessed within the alignment sleeve void.

12. A self-aligning push to mate electrical interconnect, the interconnect comprising:

a housing including a mating end and a receiving end;

an insulator bushing configured to be affixed to the receiving end of the housing;

a center pin disposed within the housing, wherein the center pin extends from the mating end of the housing to the receiving end of the housing;

a connector socket disposed within the insulator bushing, wherein the connector socket is in electrical communication with the center pin; and an alignment sleeve defining a void configured to accept and surround the housing and at least a portion of insulator bushing.

13. The interconnect of claim 12, further comprising a grounding strap in electrical communication with the housing and a grounding point.

14. The interconnect of claim 13, wherein the alignment sleeve includes a chamfered mating funnel.

15. The interconnect of claim 14, wherein the housing is configured to be secured within the alignment sleeve void with a press fit.

16. The interconnect of claim 15, wherein the chamfered mating funnel comprising a guide surface angled toward the void of the alignment sleeve.

17. The interconnect of claim 16, wherein the housing and the insulator bushing are disposed entirely within the void of the alignment sleeve.

18. The interconnect of claim 17, wherein the chamfered mating funnel of the alignment sleeve extends beyond the mating end of the housing such that the mating end of the housing is recessed within the alignment sleeve void.

19. The interconnect of claim 18, wherein the alignment sleeve includes a slot configured to receive at least a portion of the grounding strap.

20. The interconnect of claim 19, further comprising a flange affixed to the insulator bushing and wherein the alignment sleeve is positioned adjacent to the flange, such that the alignment sleeve extends beyond the mating end of the housing such that the mating end of the housing is entirely recessed within the alignment sleeve void.

* * * * *